(12) United States Patent
Kido

(10) Patent No.: US 8,861,787 B2
(45) Date of Patent: Oct. 14, 2014

(54) ENVIRONMENT RECOGNITION DEVICE AND ENVIRONMENT RECOGNITION METHOD

(75) Inventor: Shinnosuke Kido, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 243 days.

(21) Appl. No.: 13/456,627

(22) Filed: Apr. 26, 2012

(65) Prior Publication Data

US 2012/0288145 A1 Nov. 15, 2012

(30) Foreign Application Priority Data

May 12, 2011 (JP) .................................. 2011-107690

(51) Int. Cl.
G06K 9/00 (2006.01)
H04N 9/73 (2006.01)
(52) U.S. Cl.
CPC ............ *G06K 9/00791* (2013.01); *H04N 9/735* (2013.01)
USPC ........................................................ 382/103
(58) Field of Classification Search
None
See application file for complete search history.

(56) References Cited

U.S. PATENT DOCUMENTS

2010/0074469 A1\* 3/2010 Nakamori et al. ............. 382/103
2010/0158378 A1\* 6/2010 Wu et al. ....................... 382/190

FOREIGN PATENT DOCUMENTS

JP 3349060 B2 11/2002
JP 2010-224925 A 10/2010

\* cited by examiner

*Primary Examiner* — Atiba O Fitzpatrick
(74) *Attorney, Agent, or Firm* — McDermott Will & Emery LLP

(57) ABSTRACT

There are provided an environment, recognition device and an environment recognition method. The environment, recognition device obtains a luminance of a target portion in a detection area; obtains a height of the target portion; derives a white balance correction value, assuming that white balancing is performed to the obtained luminance; derives the corrected luminance by subtracting the white balance correction value and a color correction value based upon a color correction intensity indicating a degree of an influence of environment light from the obtained luminance; and provisionally determines a specific object corresponding to the target portion from the corrected luminance of the target portion based on an association of a luminance range and the specific object retained in a data retaining unit.

11 Claims, 11 Drawing Sheets

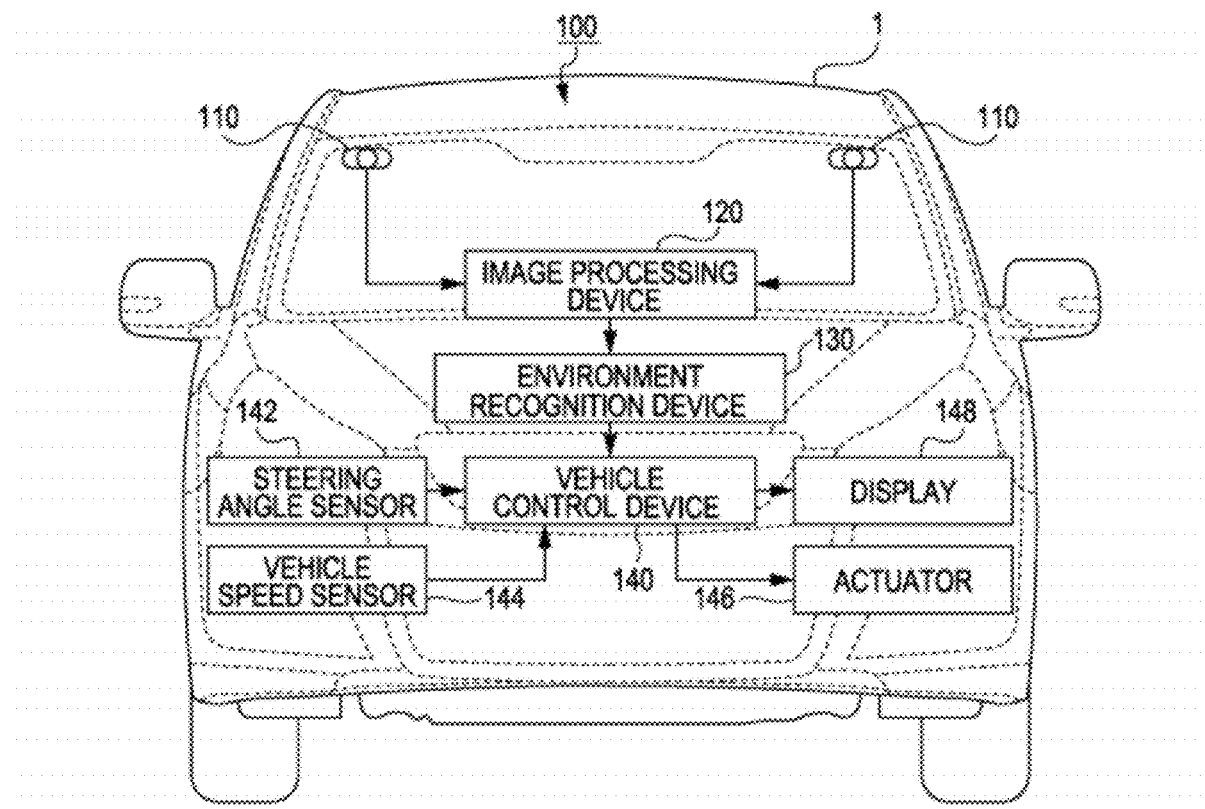

FIG. 4

| IDENTIFICATION NUMBER | 1 | 2 | 3 | 4 | 5 | 6 | 7 | 8 |
|---|---|---|---|---|---|---|---|---|
| SPECIFIC OBJECT | TRAFFIC LIGHT (RED) | TRAFFIC LIGHT (YELLOW) | TRAFFIC LIGHT (BLUE) | TAIL LAMP (RED) | TURN SIGNAL (ORANGE) | ROAD SIGN (RED) | ROAD SIGN (BLUE) | ROAD SIGN (GREEN) |
| LUMINANCE RANGE — RED | ≥200 | ≥100 | ≤50 | ≥180 | ≥150 | ≥150 | ≤50 | ≤50 |
| LUMINANCE RANGE — GREEN | ≤50 | ≥150 | ≥200 | ≤50 | ≥100 | ≤50 | ≤50 | ≥200 |
| LUMINANCE RANGE — BLUE | ≤50 | ≤50 | ≤100 | ≤50 | ≤50 | ≤50 | ≥200 | ≤50 |
| WIDTH RANGE (m) | 0.1 TO 0.3 | 0.1 TO 0.3 | 0.1 TO 0.3 | 0.1 TO 0.2 | 0.1 TO 0.2 | 0.3 TO 1.0 | 0.3 TO 1.0 | 0.3 TO 1.0 |

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-107690 filed on May 12, 2011, the entire contents of which are hereby incorporated by reference.

BACKGROUND OF THE INVENTION

1. Field of the Invention

The present invention relates to an environment recognition device and an environment recognition method for recognizing a target object based on a luminance of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle (for example, Japanese Patent No. 3349060 (Japanese Patent Application Laid-Open (JP-A) No. 10-283461)).

Further, in such techniques, there is a technique that performs more advanced control. Specifically, it not only specifies a target object simply as a solid object, but further determines whether the detected target object is a preceding vehicle that is running at the same speed as the subject vehicle or a fixed object that does not move. In this case, when the target object is detected by capturing an image of a detection area, it is necessary to extract (cut out) the target object from the captured image before specifying what the target object is.

For example, in the case in which the captured image is a color image, there may be a method for grouping a set of pixels having a same luminance (color) and recognizing a light source such as a traffic light as a target object.

However, when an imaging device that captures a target object recognizes the target object through a windshield, and strong environment light such as sunlight (backlight) is irradiated from an imaging direction with the windshield being fogged, an entire captured image may be whitish as a whole. therefore, the color phase of the light source such as a traffic light may change in some cases, thereby deteriorating the accuracy of specifying the target object.

BRIEF SUMMARY OF THE INVENTION

The present invention has been devised in order to solve the above problem and an object thereof is to provide an environment recognition device and an environment recognition method that are capable of improving the accuracy of specifying of a target object, even if an image is affected by environment light.

In order to solve the above problems, an aspect of the present invention provides an environment recognition device that includes: a data retaining unit that retains association between a range of luminance and a specific object; a luminance obtaining unit that obtains a luminance of a target portion in a detection area of a luminance image; a white balance deriving unit that derives a white balance correction value, assuming white balance correction is performed on the obtained luminance; a corrected luminance deriving unit that subtracts a color correction value, based upon the white balance correction value and a color correction intensity indicating a degree of an influence of an environment light, from the obtained luminance so as to derive a corrected luminance; and a specific object provisional determining unit that provisionally determines a specific object corresponding to the target portion from the corrected luminance of the target portion on the basis or the association retained in the data retaining unit.

The corrected luminance deriving unit may subtract the color correction value from the obtained luminance, if the color correction intensity is not less than a predetermined threshold value.

The color correction value may be a value obtained by dividing the color correction intensity by the white balance correction value.

The color correction intensity may be calculated based upon the intensity of the environment light and the transmittance of an imaging axis.

The environment recognition device may further include: a grouping unit that groups target portions, of which positions differences in a horizontal and a vertical directions are within a predetermined range and which are provisionally determined to correspond to a same specific object, into a target object; and a specific object determining unit that determines the target object is the specific object.

In order to achieve the above object, another aspect of the present invention provides an environment recognition method that includes: obtaining a luminance of a target portion in a detection area of a luminance image; deriving a white balance correction value, assuming that white balancing is performed to the obtained luminance; deriving a corrected luminance by subtracting the color correction value, based upon the white balance correction value and a color correction intensity indicating a degree of an influence of an environment light, from the obtained luminance; and provisionally determining a specific object corresponding to the target portion from the corrected luminance of the target portion based on an association of a luminance range and the specific object retained in the data retaining unit.

According to the present invention, a luminance of a target object is appropriately extracted, thereby maintaining the accuracy of specifying of a target object even if an image is affected by environment light.

BRIEF DESCRIPTION OF THE SEVERAL VIEWS OF THE DRAWINGS

FIG. 1 is a block diagram illustrating a connection relationship in an environment recognition system;

FIG. 4 is an explanatory diagram for explaining a specific object table;

DETAILED DESCRIPTION OF THE INVENTION

Figure 2A:
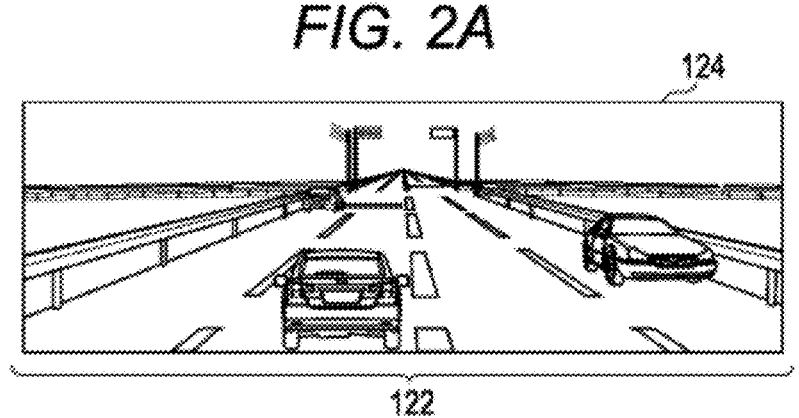
FIGS. 2A and 2B are explanatory diagrams for explaining a luminance image and a distance image.

A preferred embodiment of the present invention will be hereinafter explained in detail with reference to attached drawings. The size, materials, and other specific numerical values shown in the embodiment are merely exemplification for the sake of easy understanding of the invention, and unless otherwise specified, they do not limit the present invention. In the specification and the drawings, elements having substantially same functions and configurations are denoted with same reference numerals, and repeated explanation thereabout is omitted. Elements not directly related to the present invention are omitted in the drawings. (Environment Recognition System 100)

FIG. 1 is a block diagram illustrating connection relationship in an environment recognition system 100. The environment recognition system 100 includes a plurality of imaging devices 110 (two imaging devices 110 in the present embodiment), an image processing device 120, an environment, recognition device 130, and a vehicle control device 140 that are provided in a vehicle 1.

The image capturing devices 110 include an imaging element such as a CCD (Charge-Coupled Device) and a CMOS (Complementary Metal-Oxide Semiconductor), and can obtain a color image, that is, luminances of three color phases (red, green, blue) in units of pixels. In the present embodiment, color and luminance are dealt in the same way; if both wordings are included in one sentence, both can be read as luminance configuring color, or color having luminances. In this case, a color image captured by the imaging devices 110 is referred to as luminance image and is distinguished from a distance image to be explained later. The imaging devices 110 are disposed to be spaced apart from each other in a substantially horizontal direction so that optical axes of the two imaging devices 110 are substantially parallel in a proceeding direction of the vehicle 1. The imaging device 110 continuously generates image data obtained by capturing an image of a target object existing in a detection area in front of the vehicle 1 at every 1/60 seconds (60 fps), for example. In this case, the target object may be no only an independent three-dimensional object such as a vehicle, a traffic light, a road, and a guardrail, but also an illuminating portion such as a tail lamp, a turn signal, a traffic light that can be specified as a portion of a three-dimensional object. Each later-described functional unit in the embodiment performs processing in response to the update of such image data. The image processing device 120 obtains image data from each of the two imaging devices 110, and derives, based on the two pieces of image data, parallax information including a parallax of any block (a set of a predetermined number of pixels) in the image and a display position representing a position of the any block in a display. Specifically, the image processing device 120 derives a parallax using so-called pattern matching that searches a block in one of the image data corresponding to the block optionally extracted from the other image data. The block is, for example, an array including four pixels in the horizontal direction and four pixels in the vertical direction. In this embodiment, the horizontal direction means a horizontal direction of the display for the captured image, and corresponds to the horizontal direction in the actual space. On the other hand, the vertical direction means a vertical direction of the display of for captured image, and corresponds to the vertical direction in the actual space.

One way of performing the pattern matching is to compare luminance values (Y color difference signals) between two image data in units of a block indicating any image position. Examples include an SAD (Sum of Absolute Difference) obtaining a difference of luminance values, an SSD (Sum of Squared intensity Difference) squaring a difference and using the squared difference, and an NCC (Normalized Cross Correlation) adopting the degree of similarity of dispersion values obtained by subtracting a mean luminance value from a luminance value of each pixel. The image processing device 120 performs such parallax deriving processing in units of a block on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived per target object, but is independently derived per detection resolution unit (for example, per block) in the detection area. In this embodiment, an image obtained by associating the parallax information thus derived (corresponding to a later-described relative distance) with image data is referred to as a distance image.

Figure 2B:
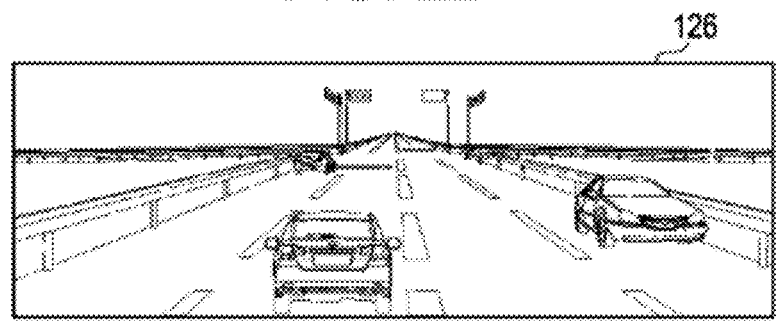

FIGS. 2A and 2B are explanatory diagrams for explaining a luminance image 124 and a distance image 126. For example, Assume that the luminance image (image data) 124 as shown in FIG. 2A is generated with regard to a detection area 122 by the two imaging devices 110. Here, for the sake of easy understanding, only one of the two luminance images 124 is schematically shown. In the present embodiment, the image processing device 120 obtains a parallax for each block from such luminance image 124, and forms the distance image 126 as shown in FIG. 2B. Each block of the distance image 126 is associated with a parallax of the block. In the drawing, for the sake of explanation, a block of which a parallax is derived is indicated by a black dot.

The parallax can be easily specified at an edge portion (portion where there is a large contrast difference between adjacent pixels) of an image, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment recognition device 130 obtains the luminance image 124 and the distance image 126 from the image processing device 120, and uses the luminances based on the luminance image 124 to determine which specific object the target object in the detection area corresponds to. In the present embodiment, the accuracy of specifying a target object is improved by processing the luminances in the luminance images 124. Further, in order to specify a target object, a relative distance from the vehicle 1 calculated based on the distance image 126 is also used. The environment recognition device 130 uses a so-called stereo method to convert the parallax information for each block in the detection area 122 of the distance image 126 into three-dimensional position information including a relative distance. The stereo method is a method using a triangulation method to derive a relative distance of a target object with respect to the imaging device 110 from the parallax of the target object. The environment recognition device 130 will be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering angle sensor 142 for detecting a steering and a vehicle speed sensor 144 for detecting a speed of the vehicle 1, thereby controlling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front of a driver, and controls the actuator 146 to automatically decelerate the vehicle 1. The vehicle control device 140 can also be integrally formed with the environment recognition device 130. (Environment recognition device 130)

Figure 3:
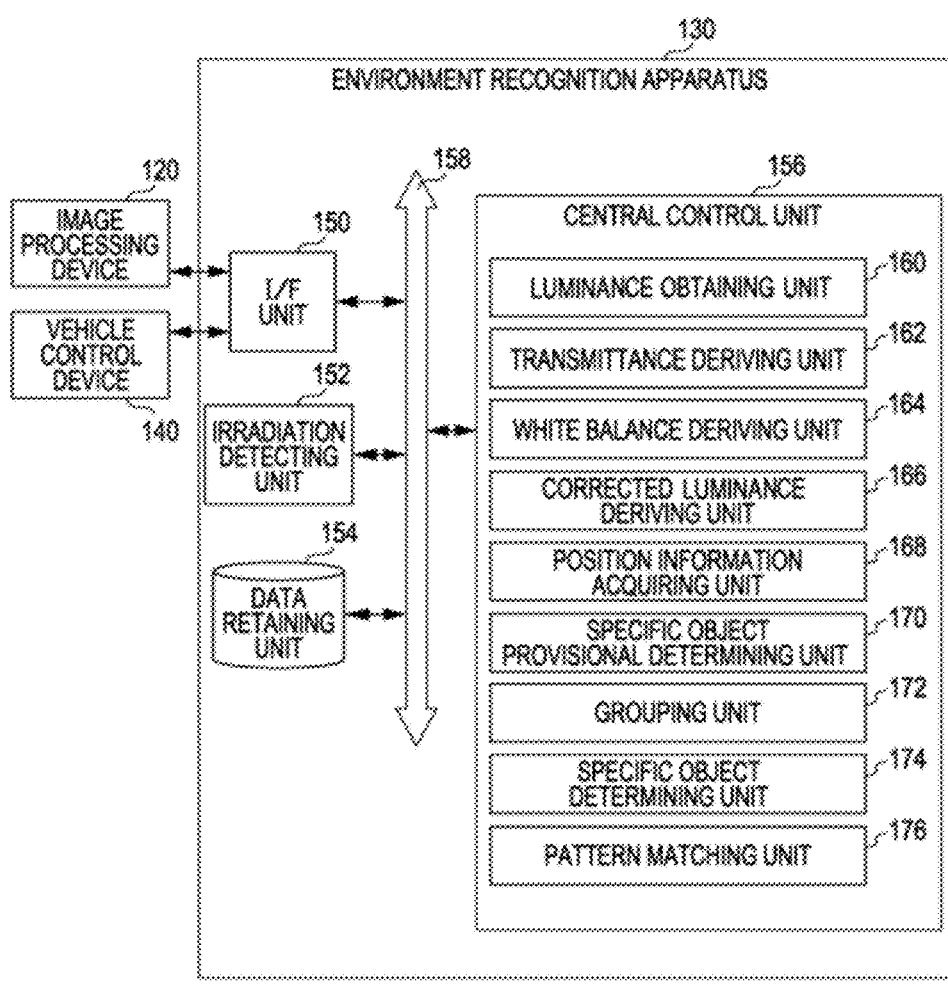
FIG. 3 is a functional block diagram schematically illustrating functions of an environment recognition device.

FIG. 3 is a functional block diagram schematically illustrating functions of an environment recognition device 130. As shown in FIG. 3, the environment, recognition device 130 includes an I/F unit 150, an irradiation detecting unit 152, a data retaining unit 154, and a central control unit 156.

The I/F unit 150 is an interface for interactive information exchange with the image processing device 120 and the vehicle control device 140. The irradiation detecting unit 152 detects intensity of environment light such as sunlight or illumination light at the outside of the vehicle 1. The data retaining unit 154 is constituted by a RAM, a flash memory, an HDD and the like, and retains a specific object table (association) and various kinds of information required for processing performed by each functional unit explained below. In addition, the data retaining unit 152 temporarily retains the luminance image 124 and the distance image 126 received from the image processing device 120. The specific object table is used as follows.

FIG. 4 is an explanatory diagram for explaining a specific object table 200. In the specific object table 200, a plurality of specific objects are associated with a luminance range 202 indicating a range of luminance and a width range 204 indicating a range of size of the specific objects. The specific objects include various objects required to be observed while the vehicle runs on the road, such as "traffic light (red)", "traffic light (yellow)", "traffic light (blue)", "tail lamp (red)", "turn signal (orange)", "road sign (red)", "road sign (blue)", and "road sign (green)". It is to be understood that the specific object is not limited to the objects in FIG. 4. The specific object table 200 defines the order of priority for specifying a specific object, and the environment recognition processing is performed in accordance with the order of priority for each specific object sequentially selected from the plurality of specific objects in the specific object table 200. Among the specific objects, for example, a specific object "traffic light (red)" is associated with luminance (red) "200 or more", luminance (green) "50 or less", luminance (blue) "50 or less", and width range "0.1 to 0.3 m".

In the present embodiment, based on the specific object table 200, a target portion among any target portions in the luminance image 124 is adopted as a candidate for any specific object if the target portion satisfies the condition of a luminance range 202 regarding the specific object. For example, if luminances of a target portion is included in the luminance range 202 of the specific object "traffic light (red)", the target portion is adopted as a candidate for the specific object "traffic light (red)". Then, when the target object made by grouping the target portions is extracted in a form which appears to be a specific object, for example, when the size of a grouped target object is included, in the width range "0.1 to 0.3 m" of the "traffic light (red)", it is determined to be a specific object. The target portion determined to be the specific object is labeled with an identification number unique to the specific object. IA pixel or a block made by collecting pixels may be used as the target portion, and in the present embodiment, pixels are used the target portions for the sake of convenience of explanation.

The central control unit 156 is made of a semiconductor integrated circuit including, for example, a central processing unit (CPU), a ROM storing a program and the like, and a RAM serving as a work area, and controls the I/F unit 150, the irradiation detecting unit 152, the data retaining unit 154, and the like by way of a system bus 158. In the present embodiment, the central control unit 156 also functions as a luminance obtaining unit 160, a transmittance deriving unit 162, a white balance deriving unit, a white balance performing unit 164, a corrected luminance deriving unit 166, a position information obtaining unit 168, a specific object provisional determining unit 170, a grouping unit 172, a specific object determining unit 174, and a pattern matching unit 176. The luminance obtaining unit 160 obtains luminances in units of target portions (pixels) (luminances of three color phases (red (R), green (G) and blue (B)) in units of pixels) from the received luminance images 124 according to a control instruction of the corrected luminance deriving unit 166 and the specific object provisional determining unit 170 to be described later. Further, after the corrected luminance deriving unit 166 to be described later derives corrected luminances, the luminance obtaining unit 160 obtains the corrected luminances are obtained.

The transmittance deriving unit 162 derives the transmittance of, for example, a windshield of the vehicle 1 crossing an imaging axis of the imaging device 110. The transmittance deriving unit 162 can derive transmittance based upon an edge intensity. Specifically, if the edge intensity of the luminance image 124 falls within a predetermined range, the transmittance deriving unit 162 derives that the transmittance is low, and if the edge intensity is lower than the predetermined range, the transmittance deriving unit 162 derives that the transmittance is high. The transmittance changes due to not only fogginess on the inner surface of the windshield caused by a relationship between the temperature of the front window and the humidity in the vehicle 1, but also dirt on the inner and outer surfaces of the windshield.

The white balance deriving unit 164 derives a white balance correction value, assuming that white balance correction is performed to the luminances obtained by the luminance obtaining unit 160. For example, an object in the luminance image 124 captured by the imaging devices 110 may have an unnatural color (luminance) depending on an environmental light. At this time, a so-called white balance correction that performs a correction on a white object within the luminance image 124 to appear correctly white. In the present embodiment, the white balance correction value is derived at least for the later-described corrected luminance deriving unit 166 based on the assumption that white balance correction is performed, regardless of whether or not the white balance correction is actually performed.

Such a white balance correction is performed, for example, by multiplying white balance correction values (r, g, b) by luminances in units of phases (R, G, B) (r×R, g×C, b×B) when a target object does not have luminances it is supposed to have, so that the target object can have luminances it is supposed to have. Accordingly, a target object that is referenced for the white balance correction desirably has a relatively large occupying area in an image, and has luminance values that can be estimated to a certain degree.

For example, the white balance deriving unit 164 derives the white balance correction values such that the luminances of the road surface in the detection area 122 can be recognized as gray. Since the environment recognition system 100 is adapted to the vehicle 1, a gray road surface that is a track is more likely to occupy the detection area 122. By thus referencing the road surface, appropriate white balance correction values can be stably derived.

The white balance deriving unit 164 may derive the white balance correction value such that the average luminance of the entire detection are 122 is gray. As described above, the gray road surface, which is the driving lane, frequently occupies the detection area 122. Therefore, the entire detection are 122 often becomes gray. By referring to the road surface, a proper white balance correction value can also stably be derived.

The white balance deriving unit 164 may derive the white balance correction value in such a manner that a crosswalk or a line, such as center line, stop line, and side strip, that limits the driving lane on the road surface in the detection area 122 is made white. The accuracy of the white balance correction becomes higher, as a color to be balanced is closer to white. By referring the crosswalk or the line that limits the driving lane on the road surface, which is relatively easy to be extracted, a proper white balance correction value can be stably derived.

The white balance deriving unit 164 derives the white balance correction value, as described below, for example. When the original luminances of the center line are defined as (BR, BG, BB), and the influence of the environment light is defined as (P×A×(1/r), P×A×(1/g) P×A×(1/b)), the obtained luminances (R, G, B) can be represented as (BR+P×A×(1/r), BG+P×A×(1/g), BB+P×A×(1/b)). Here, P indicates a reflectivity of the windshield, A indicates a luminance-component of the environment light, and 1/r, 1/g, and 1/b indicate a color component of the environment light (r, g, and b are white balance values). In this case, if the original luminances (BR, BG, BB) are determined beforehand, the white balance values (r, g, b) can be derived as (r, g, b)=(PA/(R−BR), PA/(G−BG), (PA/(B−BB)), using the reflectivity P and the luminance component A. In the present embodiment, it is supposed that the white balance values are obtained as (r, g, b)=(1.64, 1.00, 1.30) according to such a calculation.

In the present embodiment, the luminances (R, G, B) are processed by utilizing the white balance values (r, g, b) thus derived. Before describing function units for processing the luminances, a technique that is a premise of processing the luminances will briefly be described.

When the detection are 122 is captured by the imaging device 110, the original color of a target object may change according to environment light as described above. Therefore, the white balance correction is performed. When the target object is a light source (self-emitting), the color thereof does not change even under different environment light such as under sunlight or in a tunnel. Accordingly, it is not necessary to perform the white balance correction. In view of this, when specifying a specific object corresponding to a light source such as the "traffic light (red)" or "tail lamp (red)", a higher specifying accuracy is attained by using the luminance image 124 that is not yet subjected to the white balance correction.

However, when a part of the windshield of the vehicle 1 on which the imaging axis of the imaging device 110 crosses is fogged or stained to deteriorate the transmittance, and when the environment light is strong, the color of the light source which is the target object may be affected by the environment light, whereby the luminance image 124 may be whitish as a whole. If the target object is not a light source, the white balance correction is performed to the luminances which are affected by the environment light (and by the transmittance) whereby a natural color can be reproduced. However, as for the light source, the white balance correction may cause luminance values different from original values. Thus, in the present embodiment, if the target object is a light source, the influence of the environment light is eliminated from the luminance image 124 which is not yet subjected to the white luminance balance correction, so as to extract the original luminances of the light source.

Here, the influence of the environment light which is to be eliminated has to be estimated. In the present embodiment, white balance correction values are derived, and the influence of the environment light is estimated by using the derived white balance correction values. Although the values corresponding to the white balance correction may be multiplied by the original luminance image 124, the obtained values might the upper limit values of the luminances. Therefore, the influence of the environment light is obtained by subtracting the values corresponding to the white balance correction from the original luminance image 124. The corrected luminance deriving unit 166 for realizing such a process will be described below.

The corrected luminance deriving unit 166 firstly derives a color correction intensity, indicating a degree of the influence of environment light, based upon the intensity of the environment light derived by the irradiation detecting unit 152 and the transmittance derived by the transmittance deriving unit 162 or a shutter value. The color correction intensity corresponds to the reflectivity P×luminance component A of the environment light. Accordingly, the color correction intensity becomes high as the intensity of the environment light is high, or as the transmittance is low. Next, if the influence of the environment light is high (that is, if the derived color correction intensity is not less than a predetermined threshold value), the corrected luminance deriving unit 166 divides the color correction intensity by the white balance correction values derived by the white balance deriving unit 164, thereby deriving color correction values (PA/r, PA/g, PA/b). Then, the corrected luminance deriving unit 166 subtracts the color correction values from the obtained luminances (R−PA/r, G−PA/g, B−PA/b), thereby deriving the corrected luminance. If the influence of the environment light is low (if the derived color correction intensity is less than the predetermined threshold value), the corrected luminance deriving unit 166 uses the obtained luminances as the corrected luminances without any change.

Figure 5A:
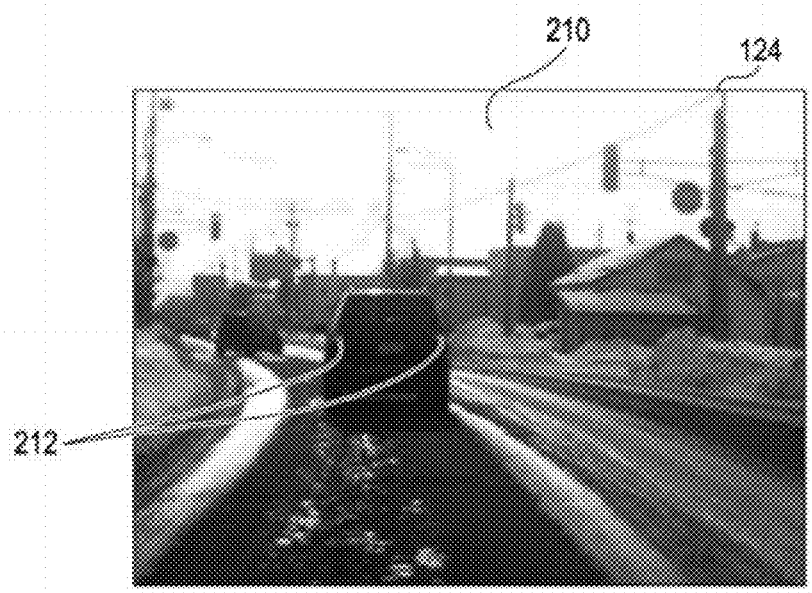
FIGS. 5A and 5B are explanatory view for describing a process of a corrected brightness deriving unit.

FIGS. 5 and 6 are explanatory views for describing the process of the corrected luminance deriving unit 166. For example, if the white balance correction is performed when the luminance image 124 is affected by the environment light, a region 210 corresponding to the sky in the luminance image 124 becomes whitish as illustrated in FIG. 5A, so that a natural color can be reproduced. However, regions 212 corresponding to tail lamps, which emit red light, may be expressed as whitish color, although they originally have high luminances.

Accordingly, when the color correction intensity PA is fixed to, for example, 64 (the luminance range of each color phase is 0 to 255, for example), the corrected luminance deriving unit 166 divides the color correction intensity by the white balance correction values derived by the white balance deriving unit 164. For example, if the white balance correction value r for R is 1.64, the color correction value (PA/r)

becomes 64/1.64=39. Similarly, if the white balance correction value g for G is 1.00, the color correction value (PA/g) becomes 64/1.00=64. If the white balance correction value b for B is 1.30, the color correction value (PA/b) becomes 64/1.30=49.

Figure 5B:
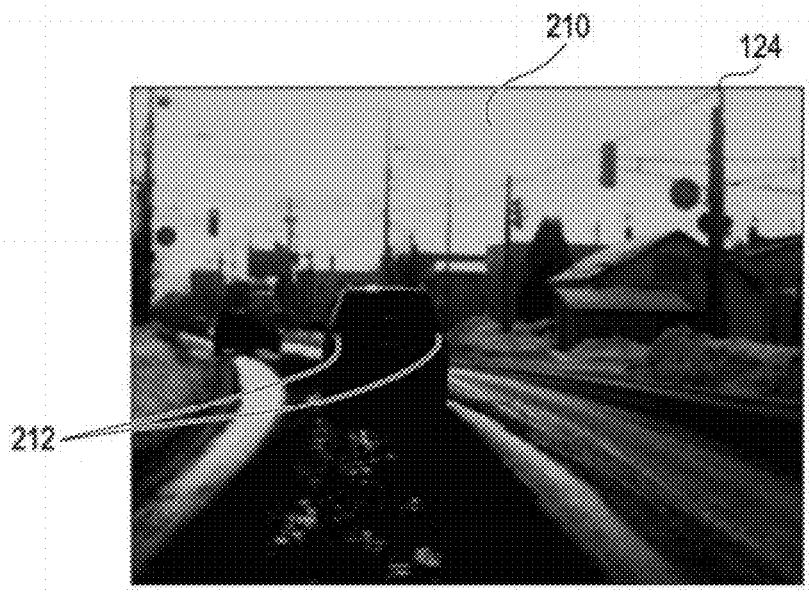

When the transmittance of the windshield is low, and strong light is received from front in the traveling direction, the corrected luminance deriving unit 166 subtracts the color correction values from the obtained luminances. For example, if color phases of any pixel of the luminance image 124 which is not yet subjected to the white balance correction are (R, G, B)=(130, 110, 123) the color correction values (39, 64, 49) re subtracted to derive the corrected luminances (R', G', B')=(91, 46, 74). When such subtraction of the color correction values is performed to the entire luminance image 124, the entire image becomes reddish as illustrated in FIG. 5B. Accordingly, a target object that is not a light source has a more red-tinged color than the original color thereof. However, a light source can be reproduced with a color very close to the original color thereof.

Figure 6A:
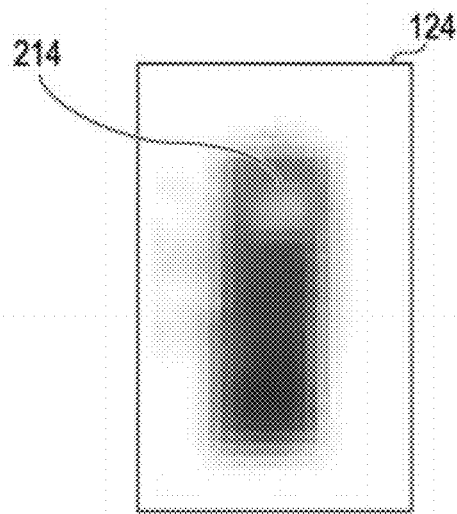
FIGS. 6A and 6B are explanatory view for describing a process of the corrected brightness deriving unit.
Figure 6B:
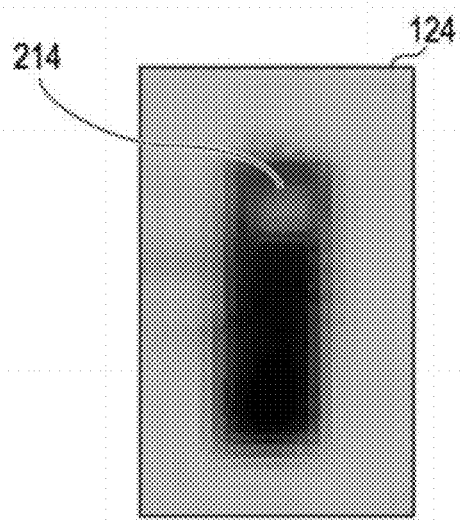

In another example, if the white balance correction is performed, a portion lighting in red in a region 214 in the luminance image 124 corresponding to a traffic light (red) is expressed with a whitish cast as illustrated in FIG. 6A. However, when corrected luminances are derived by the corrected luminance deriving unit 166, the original color of the traffic light (red) is reproduced, although the colors other than the light source become different from their original colors, as illustrated in FIG. 6B.

The position information obtaining unit 168 uses the stereo method to convert parallax information for each block in the detection area 122 of the distance image 126 into three-dimensional position information including a horizontal distance x, a height y, and a relative distance z according to a control instruction of the specific object provisional determining unit 170 explained later. The parallax information represents a parallax of each target portion in the distance image 126, whereas the three-dimensional position information represents information about the relative distance of each target portion in the real space. Accordingly, a term such as the relative distance and the height refers to a length in the real space, whereas a term such as a detected distance refers to a distance in the distance image 126. When the parallax information is not derived in units of pixels but is derived in units of blocks, that is, in units of a plurality of pixels, a calculation may be executed in units of pixels with the parallax information being deemed as parallax information about all the pixels which belong to a block.

Figure 7:
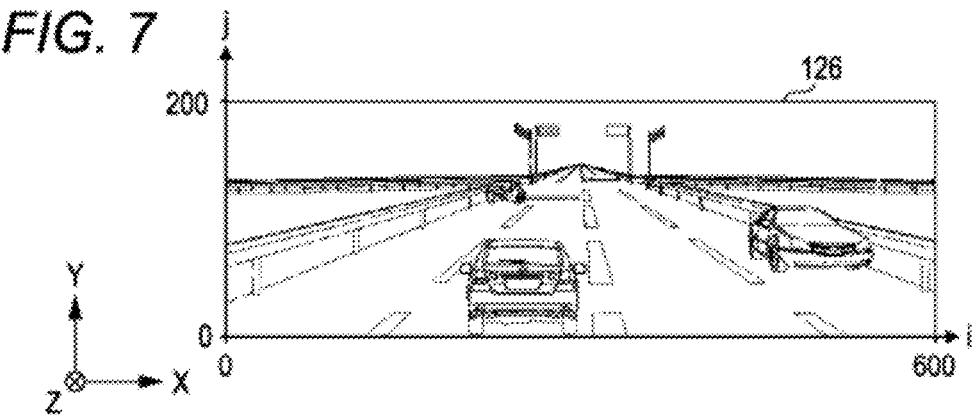
FIG. 7 is an explanatory diagram for explaining conversion into three-dimensional position information performed by a position information obtaining unit.

FIG. 7 is an explanatory diagram for explaining conversion into three-dimensional position information by the position information obtaining unit 168. First, the position information obtaining unit 168 treats the distance image 126 as a coordinate system in units of pixels as shown in FIG. 7. In FIG. 7, the lower left corner is adopted as an origin (0, 0). The horizontal direction is adopted as an i coordinate axis, and the vertical direction is adopted as a j coordinate axis. Therefore, a pixel having a parallax dp can be represented as (i, j, dp) using a pixel position i and j and the parallax dp.

The three-dimensional coordinate system in the real space according to the present embodiment will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of Z axis, and the crossing point between the road surface and a vertical line passing through the center of two imaging devices 110 is denoted as an origin (0, 0, 0). When the road is assumed to be a flat plane, the road surface matches the X-Z plane (y=0). The position information obtaining unit 162 uses (formula 1) to (formula 3) shown below to transform the coordinate of the block (i, j, dp) in the distance image 126 into a three-dimensional point (x, y, z) in the real space.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Here, CD denotes an interval (baseline length) between the imaging devices 110, PW denotes a viewing angle per pixel, CH denotes an disposed height of the imaging device 110 from the road surface, IV and JV denote coordinates (pixels) in the image at an infinity point in front of the vehicle 1, and KS denotes a distance coefficient (KS=CD/PW).

Accordingly, the position information obtaining unit 168 derives the height from the road surface on the basis of the relative distance of the target portion and the detection distance in the distance image 126 between a point on the road surface located at the same relative distance as the target portion and the target portion.

On the basis of the specific object table 200 retained in the data retaining unit 154, the specific object provisional determining unit 170 provisionally determines a specific object corresponding to the target object using the corrected luminances of the target object derived by the corrected luminance deriving unit 166.

More specifically, the specific object provisional determining unit 170 firstly causes the luminance obtaining unit 160 to obtain the corrected luminances of any given target position in the luminance image 124. Subsequently, the specific object provisional determining unit 170 sequentially selects any specific object from the specific objects registered in the specific object table 200, and determines whether the luminances of the target portion of the obtained specific object are included in the luminance range 202 of the specific object sequentially selected. Then, the luminances are determined to be in the target luminance range 202, an identification number representing the specific object is given to the target portion, and a specific object map is generated.

The specific object provisional determining unit 170 sequentially executes, for each of the plurality of target portions, a series of comparisons between the corrected luminances of the respective target portions and the luminance ranges 202 of the plurality of specific objects registered in the specific object table 200. The order in which the specific objects are selected are in accordance with the order of priority as shown in the specific object table 200 as explained above. That is, in the example of the specific object table 200 of FIG. 4, the comparison processing is executed in the following order: "traffic light (red)", "traffic light (yellow)", "traffic light (blue)", "tail lamp (red)", "turn signal (orange)", "road sign (red)", "road, sign (blue)", and "road sign (green)".

When the comparison is made according to the above order of priority, and as a result, the corrected luminances of the target portion are determined to be included in the luminance range 202 of a specific object of a high order of priority, the comparison processing is no longer performed for specific objects of a lower order of priority. Therefore, one target portion is given only at most one identification number representing one specific object. This is because a plurality of specific objects does not overlap in the space, and thus a target object that is once determined to be any given specific object by the specific object provisional determining unit 170 is no longer required to be examined to be whether or not it is another specific object. By exclusively treating the target portions in this manner, it is possible to avoid redundant specifying processing for the same target portion of which specific object is already provisionally determined, and the processing load can be reduced.

Figure 8:
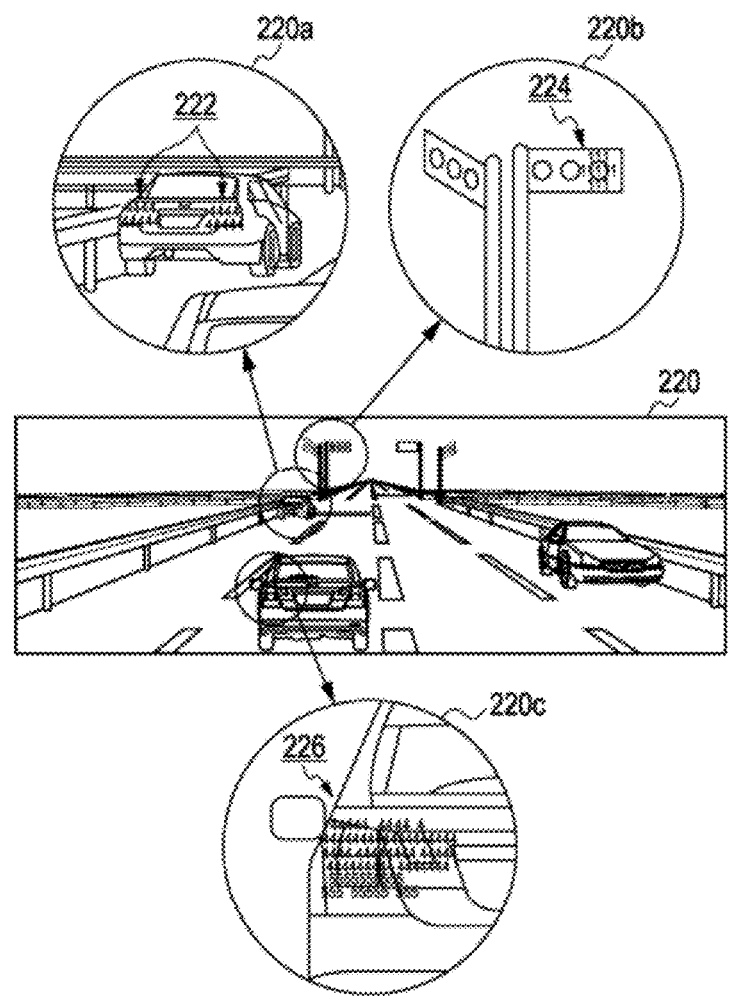
FIG. 8 is an explanatory diagram for explaining a specific object map.

FIG. 8 is an explanatory diagram for explaining a specific object map 220. The specific object map 220 is made by overlaying the identification numbers of the specific objects on the luminance image 124, and the identification number of the specific object is associated with a position corresponding to the target portion provisionally determined to be the specific object. For example, in a partial map 220a of the specific object map 220, the corrected luminances of each of the plurality of target portions 222 corresponding to the tail lamps of the preceding vehicle are compared with the luminance range 202 of the specific objects "traffic light (red)", "traffic light (yellow)", and "traffic light (blue)" in order, and finally, an identification number "4" of the specific object "tail lamp (red)" is associated therewith. In a partial map 220b of the specific object map 220, the corrected luminances of each of the plurality of target portions 224 corresponding to the light-emitting portions at the right side of the traffic light are included in the luminance range 202 of the specific object "traffic light (red)", and therefore, an identification number "1" of the specific object "traffic light (red)" is associated therewith. Further, in a partial map 220c of the specific object map 220, the corrected luminances of each of the plurality of target portions 226 corresponding to the back surface lamp portion of the preceding vehicle are compared with the luminance range 202 of each of the specific objects "traffic light (red)", "traffic light (yellow)", and "traffic light (blue)" in order, and finally, an identification number "4" of the specific object "tail lamp (red)" and an identification number "5" of the specific object "turn signal (orange)" are associated therewith. FIG. 8 shows a figure in which identification numbers are given to a plurality of target portions of the luminance image 124. This is, however, a conceptual representation for the sake of easy understanding. In reality, identification numbers are registered as data at target portions.

The grouping unit 172 adopts any given target portion provisionally determined as a base point, and groups target portions that are provisionally determined to correspond to a same specific object (attached with a same identification number), and have a difference of the horizontal distance x from that of the target portion and a difference of the height y from that of the target portion within a predetermined range, thereby making the grouped target portions into a target object. The predetermined range is represented as a distance in the real space, and can be set at any given value for example, 1.0 m). The grouping unit 172 also groups target portions that are newly added by the grouping processing. In this case, the grouping unit 166 adopts the grouped target portion as a base point, and groups the target portions which belong to a same specific object have a difference of the horizontal distance x from the target portion and a difference of the height y from the target portion within a predetermined range. Consequently, as long as distances between target portions provisionally determined to be the same specific object are within the predetermined range, all of such target portions are grouped.

In this case, the grouping unit 172 makes the determination using the horizontal distance and the height in the real space, but when a determination is made using the detection distances in the luminance image 124 and the distance image 126, the threshold value of the predetermined range for grouping is changed according to the relative distance of the target portion. As shown in FIG. 2 and the like, distant objects and close objects are represented in the flat plane in the luminance image 124 and the distance image 126, and therefore, an object located at a distant position is represented in a small (short) size and an object located at a close position is represented in a large (long) size. Therefore, for example, the threshold value of the predetermined range in the luminance image 124 and the distance image 126 is set at a small value for a distant target portion, and set at a large value for a close target portion. Therefore, even when the detection distances are different between a distant position and a close position, the grouping processing can be stably performed.

In addition to the difference of the horizontal distance x and the difference of the height y explained above, the grouping unit 172 may group target portions that have a difference of the relative distance z within a predetermined range and are provisionally determined to correspond to a same specific object. In the real space, even when target portions have a similar horizontal distance x and a similar height y, the relative distance z thereof may be greatly different. In such case, the target portions belong to different target objects. Therefore, when any one of the horizontal distance x, the height y, and the relative distance z is greatly different, the group of the target portions may be deemed as an independent, target object. In so doing, it is possible to perform highly accurate grouping processing.

In the above description, each of the difference of the horizontal distance x, the difference of the height y, and the difference of relative distance z is independently determined, and only when all of them are included within the predetermined range, the target portions are grouped into a same group. However, grouping processing may be performed using another calculation. For example, when a square mean value $\square$ of the difference of the horizontal distance x, the difference of the height y, and the difference of the relative distance z ((difference of horizontal distance x)$^2$+(difference of height y)$^2$+(difference of relative distance z)$^2$) is included within a predetermined range, target portions may be grouped into a same group. With such calculation, distances between target portions in the real space can be derived accurately, and therefore, grouping accuracy can be enhanced.

When a target object made as a result of grouping processing by the grouping unit 172 satisfies a predetermined condition, the specific object determining unit 174 determines that the target object is a specific object. For example, as shown in FIG. 4, when the width range 204 is associated with the specific object table 200, and the size of a target object (both the horizontal distance x and the height y of the target object) is included in the width range 204 of a specific object provisionally determined with regard to the target object on the basis of the specific object table 200, the specific object determining unit 174 determines the target object as the specific object. A separate width range 204 may be set for each of the horizontal distance x and the height y. Here, it is examined whether the target object is of a size adequate to be deemed as a specific object. Therefore, when the size of the target object is not included in the width range 204, the target object can be excluded as information unnecessary for the environment recognition processing.

As a result, the environment recognition device 130 can extract, from the luminance image 124, one or more target objects as specific objects, and the information can be used for various kinds of control. For example, when the specific object "traffic light (red)" is extracted, this indicates that the target object is a fixed object that does not move, and when the target object is a traffic light for the lane of the vehicle 1, this indicates that the vehicle 1 has to stop or decelerate. When the specific object "tail lamp (red)" is extracted, this indicates that there is a preceding vehicle travelling together with the vehicle 1 and that the back surface of the preceding vehicle is at the relative distance of the specific object "tail lamp (red)".

When a specific object determined by the specific object determining unit 174 is, for example, a "sign" and it is assumed that the specific object indicates a speed limit, the pattern matching unit 176 further executes pattern matching for a numerical value indicated therein, and specifies the numerical value. In this manner, the environment recognition device 130 can recognize the speed limit, and the like of the traffic lane in which the subject vehicle is travelling.

In the present embodiment, the specific object determining unit 174 firstly extracts a plurality of limited specific objects, and then only has to perform the pattern matching only on the extracted specific objects. Therefore, in contrast to the conventional case where pattern matching is performed on the entire surface of the luminance image 124, the processing load is significantly reduced.

(Environment Recognition Method)

Figure 9:
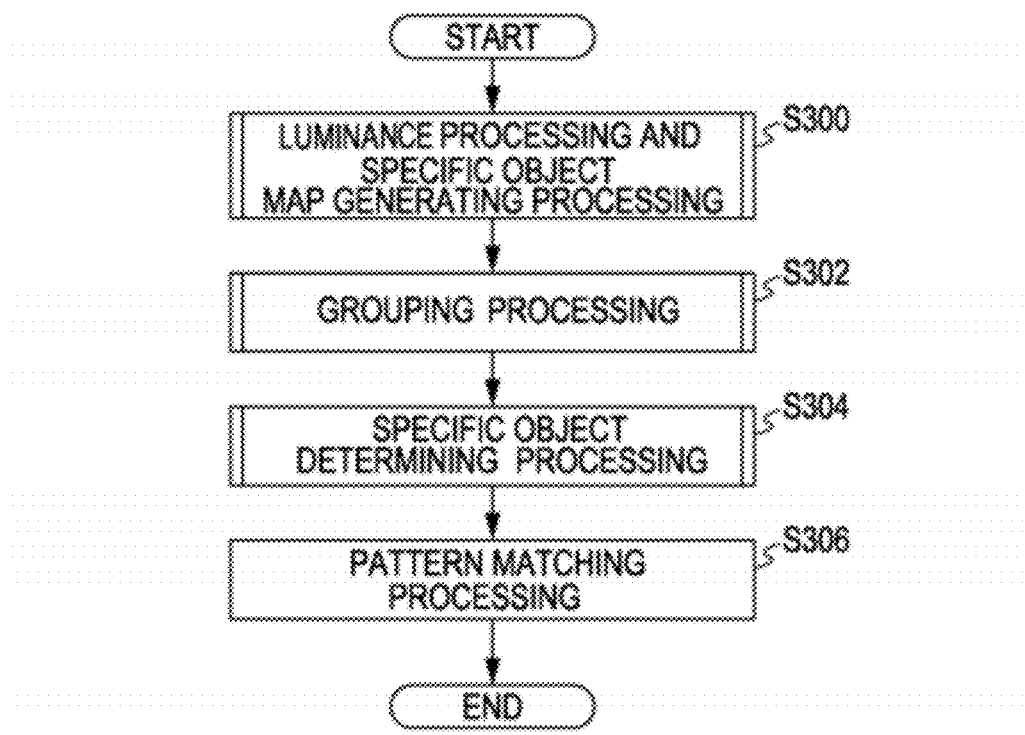
FIG. 9 is a flowchart illustrating an overall flow of an environment recognition method.
Figure 10:
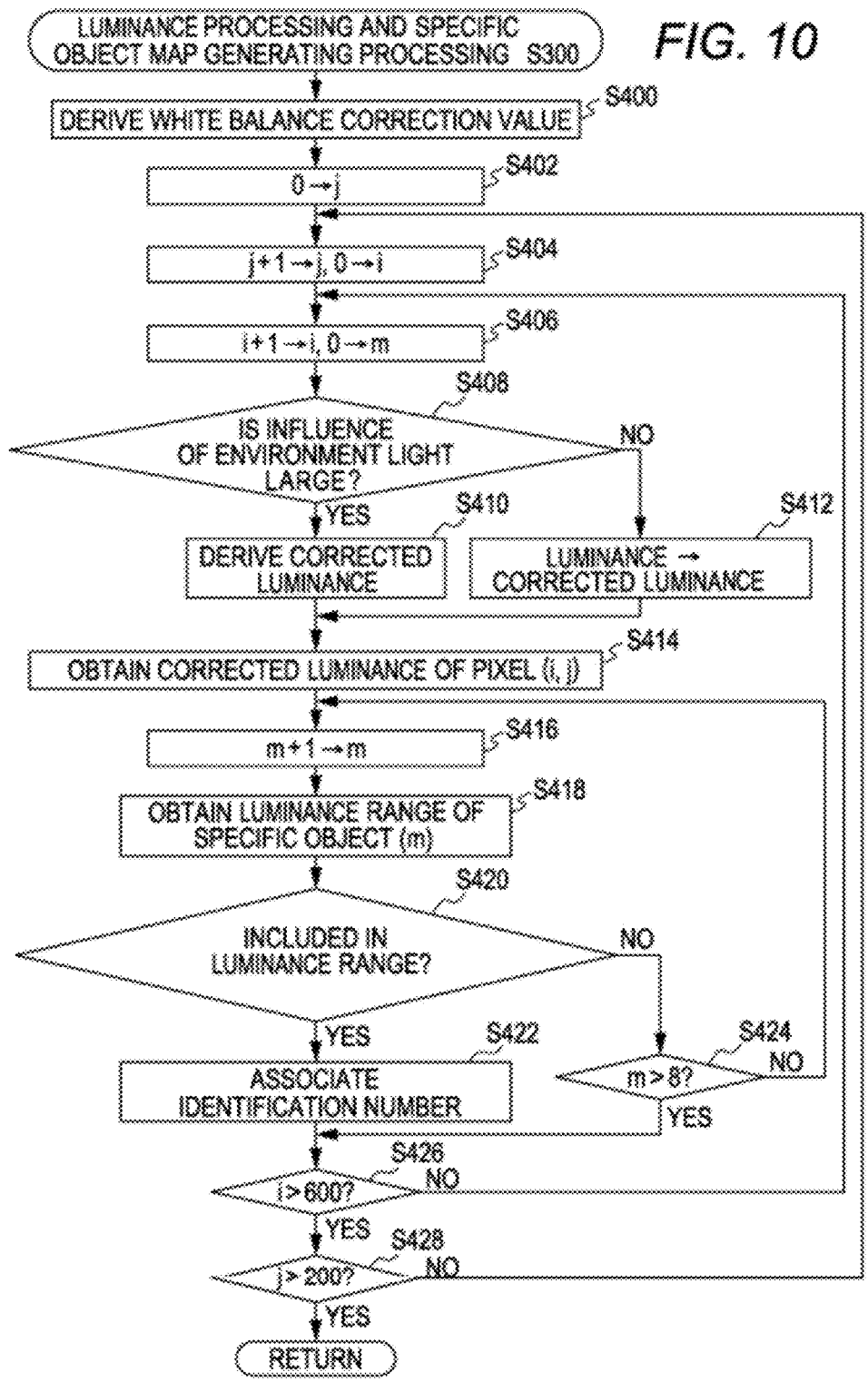
FIG. 10 is a flowchart illustrating a flow of luminance processing and specific object map generating processing.
Figure 11:
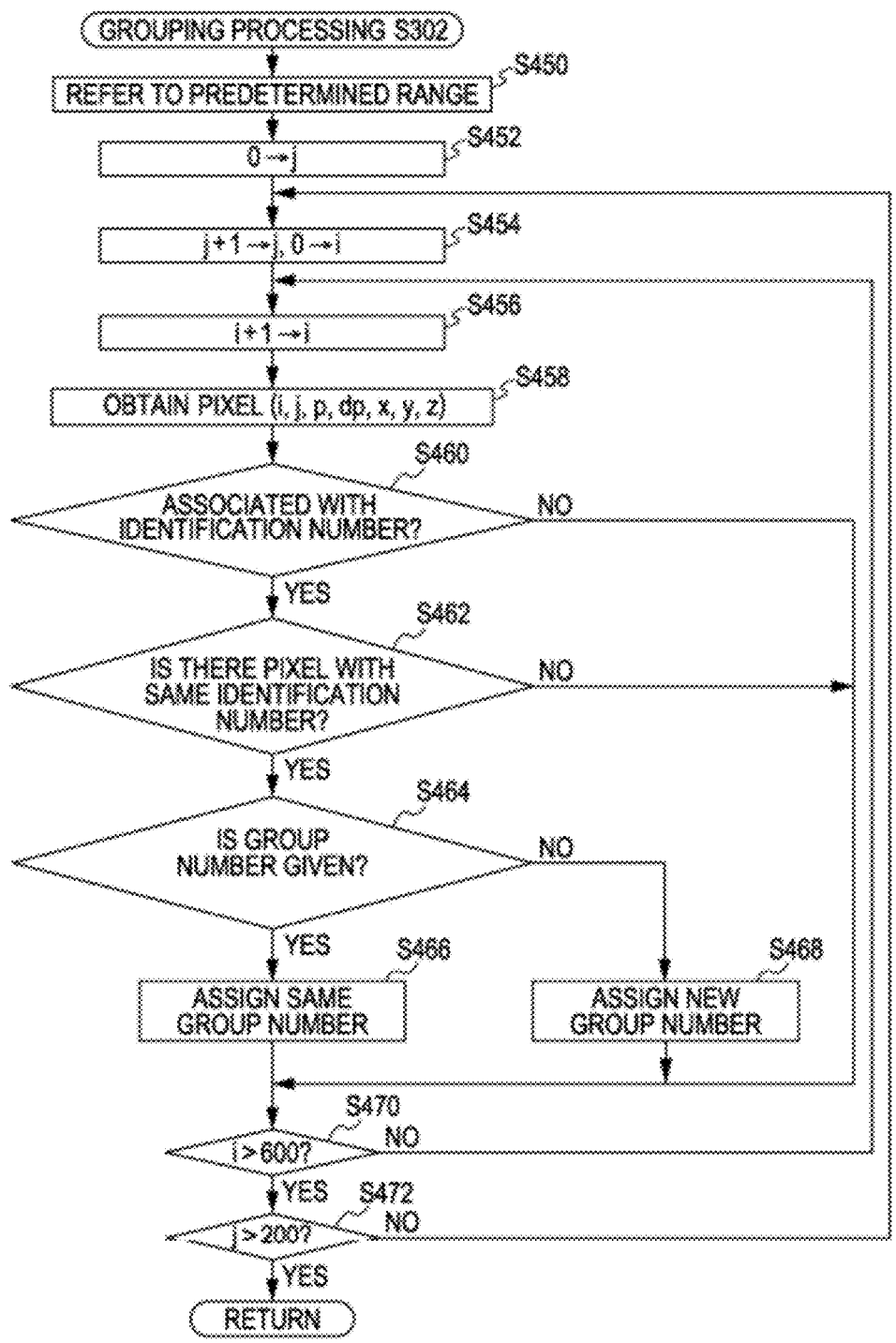
FIG. 11 is a flowchart illustrating a flow of grouping processing.
Figure 12:
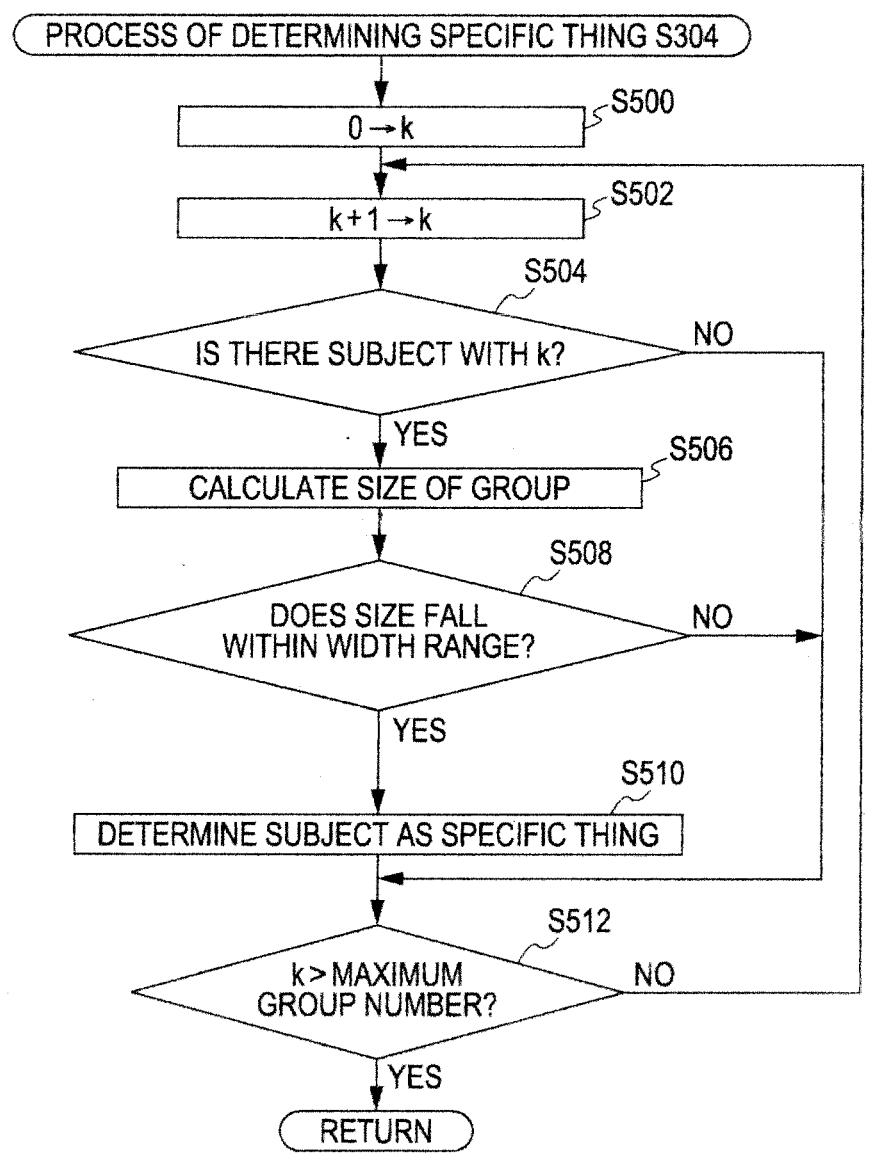
FIG. 12 is a flowchart illustrating a flow of specific object determining processing.

Hereinafter, specific processing performed by the environment recognition device 130 will be explained based on the flowchart shown in FIGS. 9 to 12. FIG. 9 illustrates an overall flow of interrupt processing when the image processing device 120 transmits the distance image (parallax information) 126. FIGS. 10 to 12 illustrate subroutines therein. In this description, pixels are used as target portions, and the lower left corners of the luminance image 124 and the distance image 126 are origins. The processing is performed according to the environment recognition method in a range of 1 to 600 pixels in the horizontal direction of the image and 1 to 200 pixels in the vertical direction of the image. In this description, the number of specific objects to be checked is assumed to be eight.

As shown in FIG. 9, when an interrupt occurs according to the environment recognition method in response to reception of the distance image 126, the luminance image 124 obtained from the image processing device 120 is referred to and the luminances are processed according to the influence of the environment light, whereby a specific object map 220 is generated (S300).

Subsequently, specific objects provisionally determined are made into a group (S302), and the grouped target objects are determined as a specific object (S304). If it is necessary to further obtain information from the specific object thus determined, the pattern matching unit 176 executes the pattern matching on the specific object (S306). Hereinafter, the above processing will be explained more specifically.

(Luminance Processing and Specific Object Map Generating Processing S300)

As shown in FIG. 10, the white balance deriving unit 164 derives white balance correction values, assuming that white balancing is performed to the luminances obtained by the luminance obtaining unit 160 (S400). The specific object provisional determining unit 170 initializes (substitutes "0" to) a vertical variable j for specifying a target portion (pixel) (S402). Then, the specific object provisional determining unit 170 adds (increments) "1" to the vertical variable 1 while initializing (substituting "0" to) a horizontal variable i (S404). The specific object provisional determining unit 164 initializes (substitutes "0" to) a vertical variable j for specifying a target portion (pixel) (S402). Subsequently, the specific object provisional determining unit 164 adds "1" to (increments by 1) the vertical variable j, and initializes (substitutes "0" to) a horizontal variable i (S404). Then, the specific object provisional determining unit 164 adds "1" to the horizontal variable i, and initializes (substitutes "0" to) a specific object variable m (S406). Here, the horizontal variable i and the vertical variable j are provided to execute the specific object map generating processing on all of the 600'200 pixels, and the specific object variable m is provided to sequentially compare eight specific objects for each pixel.

Next, it is determined, whether or not the influence of the environment light is large (S408). If the influence of the environment light is determined to be large (YES in S408), the corrected luminance deriving unit 166 divides the color correction intensity PA by the white balance correction values (r, g, b), thereby deriving the color correction values (PA/r, PA/g, PA/b). Then, the corrected luminance deriving unit 166 subtracts the color correction values from the obtained luminances (R−PA/r, G−PA/g, B−PA/b), thereby deriving the corrected luminances (S410). If the influence of the environment light is not large (NO in S408), the corrected luminance deriving unit 166 uses the obtained brightness as the corrected luminances without any change (S412).

The specific object provisional determining unit 170 causes the luminance obtaining unit 160 to obtain corrected luminances of a pixel (i, j) as a target portion from the luminance image 124 (S414), adds "1" to the specific object variable m (S416), obtains the luminance range 202 of the specific object (m) (S418), and determines whether or not the luminances of the pixel (i, j) are included in the luminance range 202 of the specific object (m) (S420).

When the corrected luminances of the pixel (i, j) are included in the luminance range 202 of the specific object (m) (YES in S420), the specific object provisional determining unit 164 associates an identification number p representing the specific object (m) with the pixel, to newly name the pixel (i, j) a pixel (i, j, p) (S422). In this manner, the specific object map 210 is generated, in which a identification number is given to each pixel in the luminance image 124. When the luminances of the pixel (i, j) is not included in the luminance range 202 of the specific object (m) (NO in S420), a determination is made as to whether or not the specific object variable m is more than 8 which is the maximum number of specific objects (S424). When the specific object variable m is not more than the maximum value (NO in S424), the processings are repeated from the increment processing of the specific object variable m in step S412. When the specific object variable m is equal to or more than the maximum value (YES in S424), which means that there is no specific object corresponding to the pixel (i, j), the processing in step S426 subsequent thereto is performed.

Then, the specific object provisional determining unit 170 determines whether or not the horizontal variable i is more than 600 which is the maximum value of horizontal pixel (S426), and when the horizontal variable i is not more than the maximum value (NO in S426), the processings are repeated from the increment processing of the horizontal variable i in step 3406. When the horizontal variable i is more than the maximum value (YES in S426), the specific object provisional determining unit 164 determines whether or not the vertical variable j is more than 200 which is the maximum value of vertical pixel (S428). Then, when the vertical variable j is not more than the maximum value (NO in S428), the processings are repeated from the increment processing of the vertical variable j in step S404. When the vertical variable j is more than the maximum value (YES in S428), the specific object map generating processing is terminated. In this manner, the specific object corresponding to each pixel is provisionally determined.

(Grouping Processing S302)

As shown in FIG. 11, the grouping unit 172 refers to a predetermined range to group target portions (S450), and initializes (substitutes "0" to) the vertical variable j for specifying a target portion (pixel) (S452). Subsequently, the grouping unit 172 adds "1" to the vertical variable j, and initializes (substitutes "0" to) the horizontal variable i (S454). Then, the grouping unit 172 adds "1" to the horizontal variable i (S456).

The grouping unit 172 obtains a pixel (i, j, p, dp, x, y, z) as the target portion from the luminance image 124 (S458). Then, a determination is made as to whether an identification number p of the specific object is associated with the pixel (i, j, p, dp, x, y, z) (S460). When the identification number p is associated (YES in S460), the grouping unit 166 determines whether or not there is another pixel (i, j, p, dp, x, y, z) associated with the same identification number p in a predetermined range from the coordinate (x, y, z) in the real space of the pixel (i, j, p, dp, x, y, z) (S462).

When there is another pixel (i, j, p, dp, x, y, z) associated with the same identification number (YES in S462), the grouping unit 172 determines whether a group number g is given to any of all the pixels in the predetermined range including the pixel under determination (S464). When the group number g is given to any of them (YES in S464), the grouping unit 172 gives a value to all of the pixels included in the predetermined range and all of the pixels to which the same group number g is given, the value being the smallest group number g among the group numbers given thereto or the smallest value of numbers that have not yet used as a group number, whichever is smaller to newly name the pixels a pixel (i, j, p, dp, x, y, z, g) (S466). When the group number g is given to none of them (NO in S464), the smallest value of numbers that have not yet used as a group number is newly given to all the pixels in the predetermined range including the pixel under determination (S468).

In this manner, when there is a plurality of target portions that have a same identification number in the predetermined range, grouping process is performed by giving one group number g. If a group number g is given to none of the plurality of target portions, a new group number g is given, and if a group number g is already given to any one of them, the same group number g is given to the other target portions. However, when there is a plurality of group numbers g in the plurality of target portions, the group numbers g of all the target portions are replaced with one group number g so as to treat the target portions as one group.

In the above description, the group numbers g of not only all the pixels included in the predetermined range but also all the pixels to which the same group number g is given are changed at a time. The primary reason for this is to avoid dividing the group already unified by changing of the group numbers g. In addition, the smallest group number g or the smallest value of numbers that have not yet used as a group number, whichever is smaller, is employed in order to avoid making a skipped number as much as possible upon group numbering. In so doing, the maximum value of the group number g does not become unnecessarily large, and the processing load can be reduced.

When an identification number p is not associated (NO in S460), or when there is no other pixel that has the identification number p (NO in S462), the processing in step S470 subsequent thereto is performed.

Subsequently, the grouping unit 172 determines whether or not the horizontal variable i is more than 600 which is the maximum value of horizontal pixel (S470). When the horizontal variable i is not more than the maximum value (NO in S470), the processings are repeated from the increment processing of the horizontal variable i in step S456. When the horizontal variable i is more than the maximum value (YES in S470), the grouping unit 172 determines whether or not the vertical variable j is more than 200 which is the maximum value of vertical pixel (S472). When the vertical variable j is not more than the maximum value (NO in S472), the processings are repeated from the increment processing of the vertical variable j in step S454. When the vertical variable j is more than the maximum value (YES in S472), the grouping processing is terminated.

(Specific Object Determining Processing S304)

As shown in FIG. 12, the specific object determining unit 174 initializes (substitutes "0" to) a group variable k for specifying a group (S500). Subsequently, the specific object determining unit 174 adds "1" to the group variable k (S502). The specific object determining unit 174 determines whether or not there is a target object of which group number g is the group variable k from the luminance image 124 (S504). When there is such target object (YES in S504), the specific object determining unit 174 calculates the size of the target object to which the group number g is given (S506). Then, a determination is made as to whether or not the calculated size is included in the width range 206 of a specific object represented by the identification number p associated with the target object of which group number g is the group variable k (S508).

When the size is included in the width range 204 of the specific object represented by the identification number p (YES in S508), the specific object determining unit 168 determines that the target object is the specific object (S510). When the size is not included in the width range 204 of the specific object represented by the identification number p (NO in S508), or, when there is no target object of which group number g is the group variable k (NO in S504), the processing in step S512 subsequent thereto is performed.

Subsequently, the specific object determining unit 174 determines whether or not the group variable k is more than the maximum value of group number set in the grouping processing (S512). Then, when the group variable k is not more than the maximum value (NO in S512), the processings are repeated from the increment processing of the group variable k in step S502. When the group variable k is more than the maximum value (YES in S512), the specific object determining processing is terminated. As a result, the grouped target objects are formally determined to be the specific object.

As described above, even if an image is affected by the environment light, the environment recognition unit 130 can maintain the accuracy of specifying precision the target object by appropriately extracting the luminances thereof.

In addition, a program for allowing a computer to function as the environment recognition device 130 is also provided as well as a storage medium such as a computer-readable flexible disk, a magneto-optical disk, a ROM, a CD, a DVD, a BD storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

In the above embodiment, an example is shown in which, firstly, the corrected luminances of a target portion is exclusively with any of specific objects, and then a determination is made as to whether the height and the size of a target object made by grouping the target portions are appropriate for the specific object or not. However, the present invention is not limited to this. A determination can be made based on any one of the specific object, the corrected luminances, the height, and the size, and the order of determinations may be defined in any order.

In the above embodiment, the three-dimensional position of the target object is derived based on the parallax between image data using the plurality of imaging devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected, when the laser beam is irradiated the object, and measures the distance to the object based on the time required for this event.

In the present embodiment, it is assumed that the imaging device 110 obtains a color image. However, the present invention is not limited to such case. Alternatively, a monochrome image may be obtained. In this case, the specific object table 200 is defined by a single-color luminance.

The above embodiment describes an example in which the position information obtaining unit 166 receives the distance image (parallax information) 126 from the image processing device 120, and generates the three-dimensional position information. However, the present invention is not limited to such case. The image processing device 120 may generate the three-dimensional position information in advance, and the position information obtaining unit 166 may obtain the generated three-dimensional position information. Such a functional distribution can reduce the processing load of the environment recognition device 130.

In the above-mentioned embodiment, the luminance obtaining unit 160, the transmittance deriving unit 162, the white balance deriving unit 164, the corrected luminance deriving unit 166, the position information obtaining unit 168, the specific object provisional determining unit 170, the grouping unit 172, the specific object determining unit 174, and the pattern matching unit 176 are configured to be operated by the central control unit 154 with software. However, the functional units may be configured with hardware.

The specific object determining unit 168 determines a specific object by, for example, whether or not the size of the target object is included in the width range 206 of the specific object. However, the present invention is not limited to such case. The specific object determining unit 168 may determine a specific object when various other conditions are also satisfied. For example, a specific object may be determined when a shift the relative distance in the horizontal direction and the vertical direction is substantially constant (continuous) in a target object or when the relative movement speed with respect to the z coordinate is constant. Such a shift in the relative distance in the horizontal direction and the vertical direction in the target object may be specified by linear approximation by the Hough transform or the least squares method.

The steps of the environment recognition method in this specification do not necessarily need to be processed chronologically according to the order described in the flowchart The steps may be processed in parallel, or may include processings using subroutines.

The present invention can be used for an environment recognition device and an environment recognition method for recognizing a target object based on the luminances of the target object in a detection area.

The invention claimed is:

1. An environment recognition device comprising:
a data retaining unit that retains association between ranges of luminance value and specific objects;
a luminance obtaining unit that obtains a luminance value of a target portion in a detection area of a luminance image;
a white balance obtaining unit that obtains a white balance correction value;
a corrected luminance obtaining unit that subtracts a color correction value, which is obtained based upon the white balance correction value and a color correction intensity indicating a degree of an influence of an environment light, from the obtained luminance value so as to obtain a corrected luminance value; and
a first specific object determining unit that determines a specific object corresponding to the target portion based on the corrected luminance value of the target portion by using the association retained in the data retaining unit,
wherein the color correction intensity is calculated based upon an intensity of the environment light and a transmittance of a transmission body crossing an imaging axis.

2. The environment recognition device according to claim 1, wherein:
the corrected luminance is calculated by subtracting the color correction value from the obtained luminance value and the specific object is determined by the first specific object determining unit based on the corrected luminance value, if the color correction intensity is not less than a predetermined threshold value, and
the specific object is determined by the first specific object determining unit based on the obtained luminance value without calculating the corrected luminance value, if the color correction intensity is less than the predetermined threshold value.

3. The environment recognition device according to claim 1, wherein the color correction value is a value obtained by dividing the color correction intensity by the white balance correction value.

4. The environment recognition device according to claim 2, wherein the color correction value is a value obtained by dividing the color correction intensity by the white balance correction value.

5. The environment recognition device according to claim 1, further comprising:
a grouping unit that groups target portions, of which positions differences in a horizontal and a vertical directions are within a predetermined range and which are determined by the first specific object determining unit to correspond to a same specific object, into a target object; and
a second specific object determining unit that determines the target object is the specific object.

6. The environment recognition device according to claim 2, further comprising:
a grouping unit that groups target portions, of which positions differences in a horizontal and a vertical directions are within a predetermined range and which are determined by the first specific object determining unit to correspond to a same specific object, into a target object; and
a second specific object determining unit that determines the target object is the specific object.

7. The environment recognition device according to claim 3, further comprising:

a grouping unit that groups target portions, of which positions differences in a horizontal and a vertical directions are within a predetermined range and which are determined by the first specific object determining unit to correspond to a same specific object, into a target object; and a second specific object determining unit that determines the target object is the specific object.

8. The environment recognition device according to claim 4, further comprising:

a grouping unit that groups target portions, of which positions differences in a horizontal and a vertical directions are within a predetermined range and which are determined by the first specific object determining unit to correspond to a same specific object, into a target object; and a second specific object determining unit that determines the target object is the specific object.

9. An environment recognition method comprising:

obtaining a luminance value of a target portion in a detection area of a luminance image;

obtaining a white balance correction value;

obtaining a corrected luminance value by subtracting the color correction value, which is obtained based upon the white balance correction value and a color correction intensity indicating a degree of an influence of an environment light, from the obtained luminance value; and determining a specific object corresponding to the target portion based on the corrected luminance value of the target portion by using an association of luminance ranges and specific objects retained in a data retaining unit;

wherein the color correction intensity is calculated based upon an intensity of the environment light and a transmittance of a transmission body crossing an imaging axis.

10. The environment recognition device according to claim 1, wherein the specific object is a light source and the light source is determined based on the corrected luminance value without subjecting to the white luminance balance correction.

11. An environment recognition device comprising:

an input unit configured to input a luminance image;

a central control unit; and an output unit configured to output a result determined by the central control unit, wherein the central unit is configured to:

calculate a color correction intensity based upon an intensity of an environment light and a transmittance of a transmission body crossing an imaging axis, obtain a corrected luminance value by correcting a luminance value of the input luminance image with a white balance correction value and the color correction intensity, and determine a specific object included in the luminance image by using the corrected luminance value.

* * * * *